United States Patent [19]

Egawa et al.

[11] Patent Number: 5,661,447
[45] Date of Patent: Aug. 26, 1997

[54] COIL BOBBIN FOR A MAGNETIC HEAD CORE

[75] Inventors: Motoji Egawa; Masuhiro Nitta, both of Shizuoka-ken, Japan

[73] Assignee: Minebea Co., Ltd., Nagano, Japan

[21] Appl. No.: 494,820

[22] Filed: Jun. 26, 1995

[30] Foreign Application Priority Data

Jul. 4, 1994 [JP] Japan .................. 6-174827

[51] Int. Cl.⁶ ........................................ H01F 5/00
[52] U.S. Cl. ................................. 335/299; 360/103
[58] Field of Search ............... 335/299; 336/198; 360/103–110, 123, 128

[56] References Cited

U.S. PATENT DOCUMENTS 5,449,419  9/1995  Suzuki et al. .................. 148/305
5,546,251  8/1996  Egawa et al. .................. 360/103

Primary Examiner—Lincoln Donovan
Attorney, Agent, or Firm—Oliff & Berridge

[57] ABSTRACT

A coil bobbin of molded resin integrally for use of a magnetic head core comprising a pair of connection plates arranged in parallel, a pair of coil winding bodies formed in U-letter shape with a rear plate, an inner side plate and an outer side plate, which are to be mounted on a pair of parallel leg portions of a magnetic head core respectively and arranged between the connection plates with the opening side in one direction, inclination surfaces provided on the tip of each side plate and obliqued toward the opening of the coil winding body respectively and hooks formed by being elongated continuously from said inclination surfaces and projected in the opening, which are provided merely on the outer side plates and hooked on each rear side of the legs of the magnetic head core.

4 Claims, 6 Drawing Sheets

COIL BOBBIN FOR A MAGNETIC HEAD CORE

BACKGROUND OF THE INVENTION

1. Field of the invention

The present invention relates to a structure of a coil bobbin for use of a magnetic head core of a floating type of magnetic head to be used for a magnetic disc.

2. Prior Art

Conventionally, as a known example of a floating type of magnetic head for use of a magnetic disc apparatus, there has been, as shown in FIG. 8, a composite type of magnetic head. In this magnetic head, a slit 2 is formed on an end of a slider 1, and a magnetic head core 3 is inserted in said slit 2 and bonded to the slider 1 using a glass 4.

Recently, there has been a tendency of the magnetic disc apparatus to be improved in response to the demand of the increase of recording density and to make the data transfer rate fast, for that purpose, the magnetic head is required to increase the resonance frequency, while the inductance of the magnetic head core is needed to be reduced.

In order to reduce the inductance of the magnetic head core, except changing a number of coil turns, it is attained by the following change of configuration of a magnetic head core, i.e. (1) to shorten the length of magnetic path, and (2) to make the thickness of the magnetic core thin.

However, when trying to realize such structure of magnetic head core, it can not be avoided to make the configuration of said magnetic head core smaller and thinner. Accordingly, in a trial for realizing such composite type of magnetic head core as shown in FIG. 8, it has been difficult to realize such head core because of handling difficulties, poor workability and easy breakage.

On the contrary, as a magnetic head which can use a magnetic head core having lowered inductance value, there is a floating magnetic head shown in FIG. 9. This floating magnetic head is formed by installing a magnetic head core 3 on the side of the slider 1 in such a manner as bridging a window 5 which is provided on an end of the slider 1.

This magnetic head core 3 is formed by bonding C-shaped first and second cores 6 and 7, and on one of bonding portions a gap 8 is provided. On legs 9 and 10 of said first and second cores 6 and 7, coils 11 and 12 are wound respectively, wherein said windings are made in a so-called balanced manner so as to cancel noise from outside.

However, in this type of floating magnetic head, the coils 11 and 12 are wound directly around the legs 9 and 10, so that such coils have been apt to be damaged by the corners of the legs 9,10 in the form of cutting or insulation malfunctioning due to the peeling of coil-coatings.

In order to prevent such cutting of coils and malfunction of insulation, it is considered to wind coils on a magnetic head core through a coil bobbin attached to the magnetic head core. One example as such is shown in FIG. 10, wherein a bobbin consists of a body 14 having a C shape in section, both ends 16 of which function as a hook, a pair of flanges 15 formed on both ends of said body 14 in unitary manner with said hooks 16,16 having slopes 18 inclined toward an opening 17 of the bobbin. These slopes 18 function to open the opening 17 wider when the coil bobbin 13 is installed on a core. The hooks 16 of the coil bobbin 13 are hooked on a leg of C-shaped core not shown to prevent it from removing.

Further, another example of such coil bobbin is illustrated in FIG. 11, wherein said bobbin is formed with a pair of opposing plate-like arms 20, 20, one side edges of those arms are connected by a back plate 21 to form a frame 22 having U-letter shape in section. From opposing plate-like arms 20, 20 hooking plates 23, 23 are projected toward the opening of the frame 22. And, the plate-like arms 20 and the back plate 21 surround a leg of C-type core not shown, and the hooking plates 23, 23 function as a stopper for securing the bobbin on the core.

Now, upon using the above mentioned bobbins of FIGS. 10 or 11 in the floating magnetic head shown in FIG. 9, two bobbins 13 are needed, which causes an extra mounting process. And, when pushing a bobbin 13 against a core for installing, there is an anxiety of damaging the corners of the core, on which a coil bobbin 13 is pushed, because two hooks are projected in such a manner as reducing the spacing of the opening 17.

The present invention has been made in the light of the above problems, in which a bobbin for use of a magnetic head core, on one hand prevents cutting of coils to be wound and malfunctioning of insulation, and on the other hand increases mounting workability and enables to wind coils in balance manner.

SUMMARY OF INVENTION

According to the present invention, a coil bobbin of integrally molded resin for use of a magnetic head core is provided, which comprises a pair of connection plates arranged in parallel, a pair of coil winding bodies formed in U-letter shape with a rear plate, an inner side plate and an outer side plate, which are to be mounted on a pair of parallel leg portions of a magnetic head core respectively and arranged between said connection plates with the opening side in one direction, inclination surfaces provided on the tip of each side plate and obliqued toward the opening of the coil winding body respectively and hooks formed by being elongated continuously from said inclination surfaces and projected in the opening, which are provided merely on the outer side plates and hooked on each rear side of the legs of the magnetic head core.

Further, according to the present invention, the height size and thickness size of the inner side plate are smaller than the height size and the thickness size of the outer side plate.

Further, according to the present invention, the coil bobbin is formed symmetrical leftward and rightward with respect to a vertical plane crossing perpendicularly to a longitudinal direction of the connection plate and also symmetrical upward and downward with respect to a horizontal plane crossing a center line between a pair of connection plates.

Further, according to the present invention, all of the inner and outer side plates comprise slits having a width size smaller than the diameter size of the coil to be wound on said bobbin.

By the above structure, when the inclination surfaces of the inner side plates and the outer side plates are placing on the front edge portions of the legs of a magnetic head core and pushed, the distal ends of those side plates are resiliently opened and finally the hooks are hooked on the rear sides of the legs, thereby the coil winding bodies are formed on the leg portions on which coils are wound.

PREFERRED EMBODIMENT OF THE PRESENT INVENTION

Figure 5:
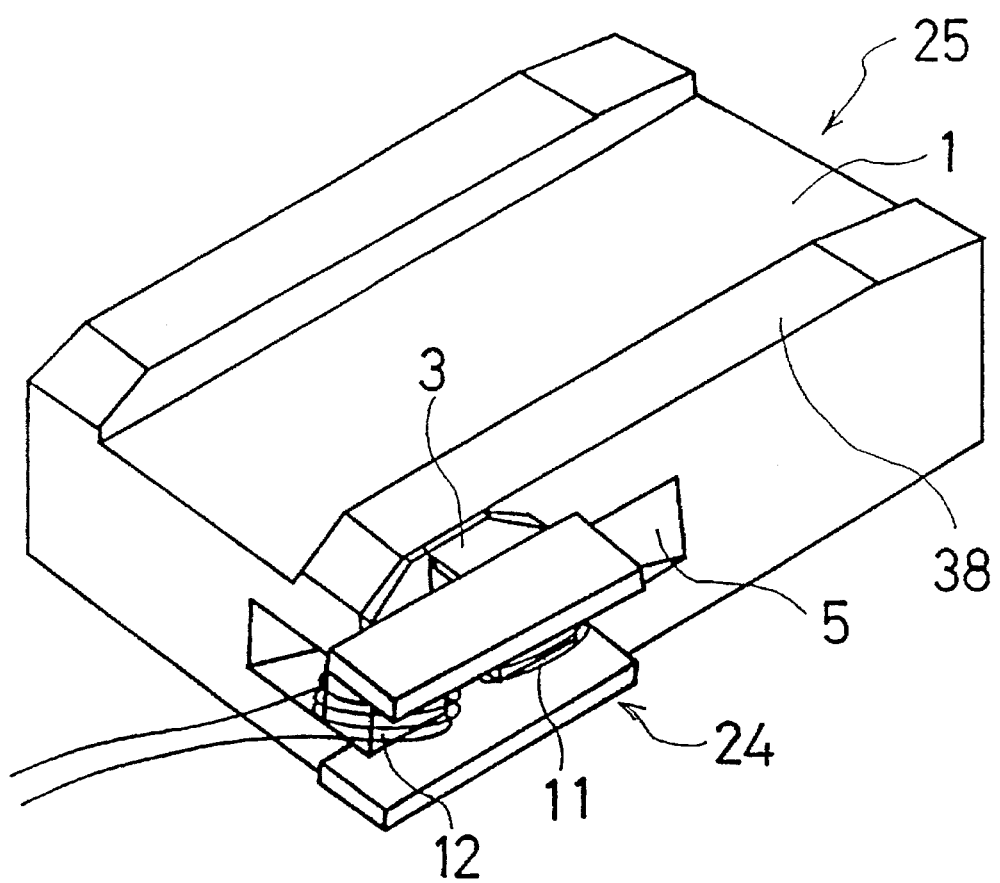
FIG. 5 shows a perspective view of a floating magnetic head on which the coil bobbin for use of a magnetic head core according to the present invention was installed
Figure 6:
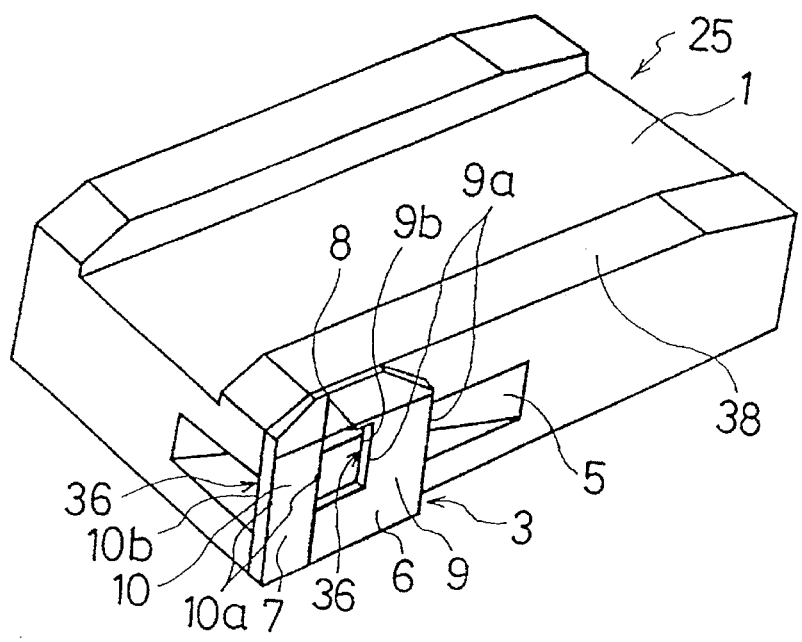
FIG. 6 shows a perspective view of a floating magnetic head on which the coil bobbin for use of a magnetic head core according to the present invention is to be installed

Now, the first embodiment of a coil bobbin according to the present invention will be explained referring to FIGS. 1–6. FIG. 5 shows a floating magnetic head 25 installed with a coil bobbin 24 and FIG. 6 shows a general structure of the floating magnetic head 25 to be installed with a coil bobbin 24. In FIG. 6, it is shown that on one end of a slider made of a ceramics such as calcium titanate, a window 5 is provided, and on the side of the slider 1 a magnetic head core 3 made of ferrite is bonded.

This magnetic head core 3 consists of a first core 6 formed in C-letter shape and a second core 7 formed in I-letter shape, which are bonded on their ends, wherein at one of the bonded portions an air gap 8 is provided.

The first core 6 and the second core 7 have legs 9 and 10 respectively (hereinafter referred to as "first leg and second leg"), which are arranged in parallel. On this magnetic head core 3, the coil bobbin 24 for use of magnetic head core of the present invention is installed.

Figure 1:
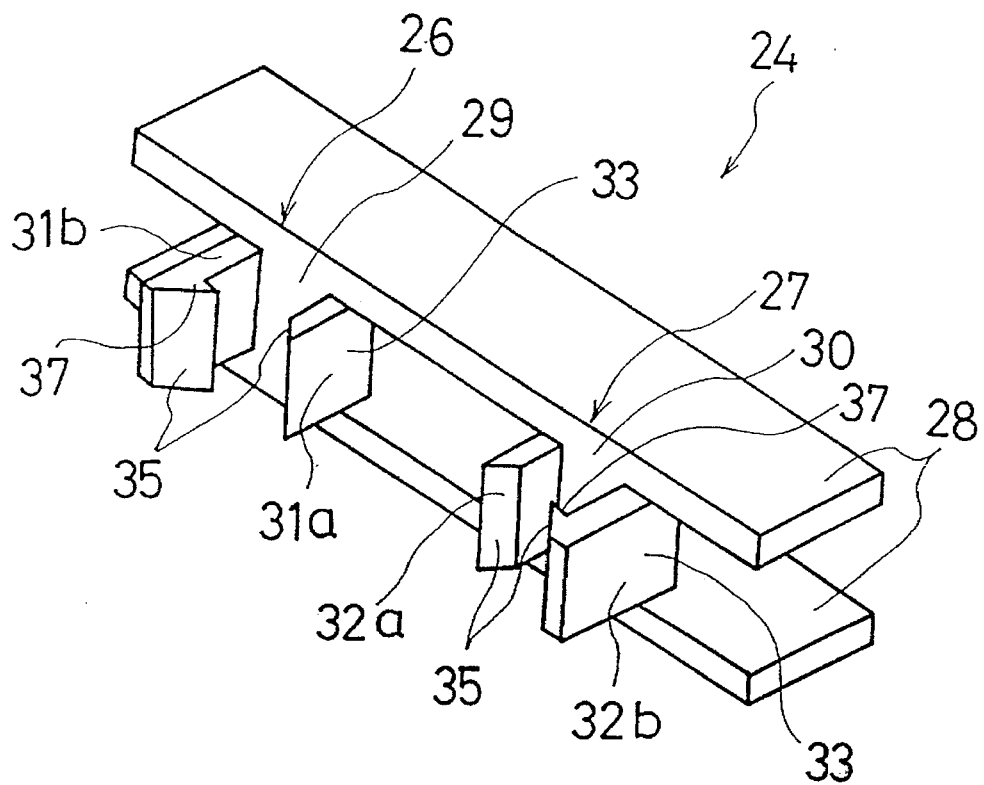
FIG. 1 shows a perspective view of the first embodiment of a coil bobbin for use of a magnetic head core according to the present invention
Figure 2:
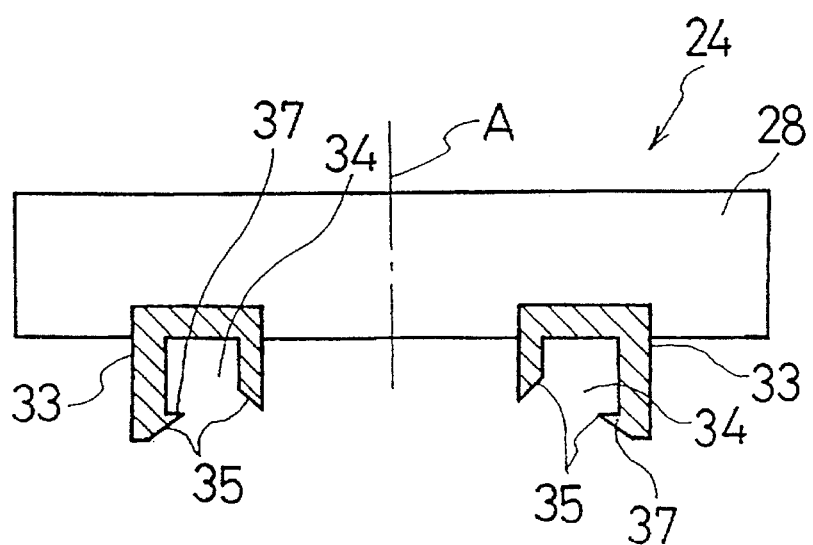
FIG. 2 shows a horizontally cross sectional view of the first embodiment of a coil bobbin for use of a magnetic head core according to the present invention
Figure 3:
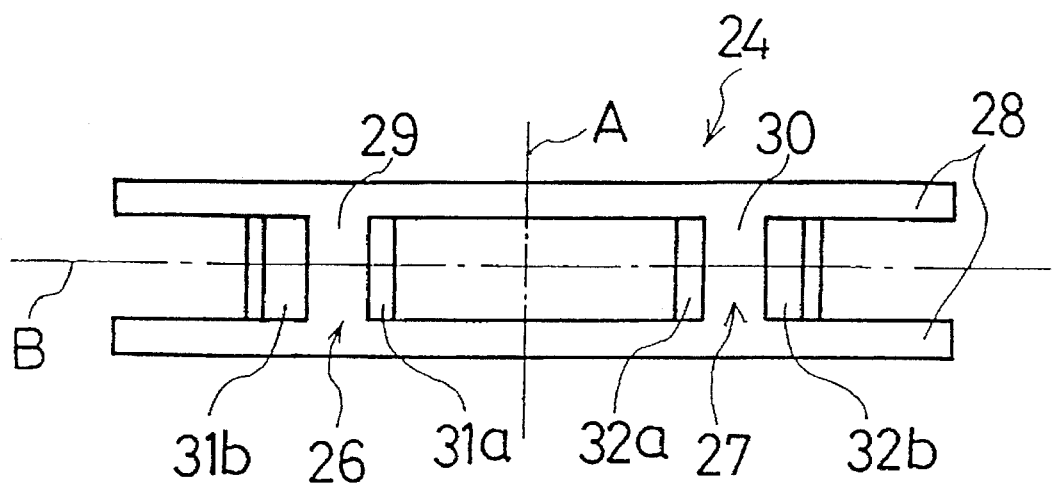
FIG. 3 shows a front view of the first embodiment of a coil bobbin for use of a magnetic head core according to the present invention
Figure 4:
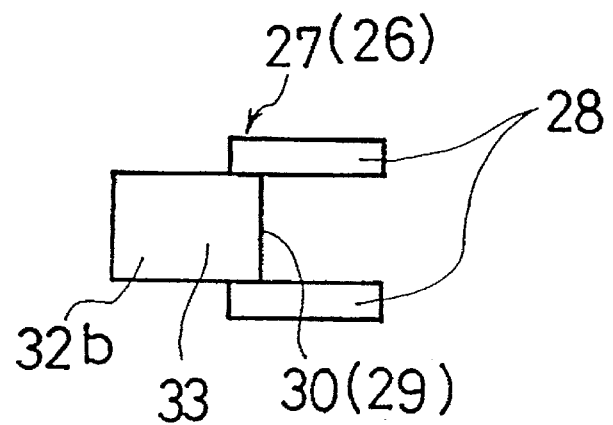
FIG. 4 shows a side view of the first embodiment of a coil bobbin for use of a magnetic head core according to the present invention

Referring to FIGS. 1–3, the coil bobbin 24 made from a synthetic resin such as polyacetal comprises a pair of coil winding bodies (hereinafter referred to as "first coil winding body and second coil winding body") 26, 27 having a configuration of approximate U-letter in a horizontal section and a pair of upper and lower connection plates 28, 28 which are molded in a unit with the coil winding bodies 26, 27 and connect the first coil winding body 26 and the second coil winding body 27 in such a structure as the coil winding bodies 26, 27 are clamped by the connection plates 28, 28.

The first and the second coil winding bodies 26, 27 comprises back plates 29, 30 (hereinafter referred to as "the first back plate 29 and the second back plate 30" respectively), which may oppose to the front surface of the first leg 9 and the second leg 10 when installing, and inner and outer side plates (hereinafter referred to as "first and second inner side plates and outer side plates respectively) 31a, 31b; 32a, 32b.

The first and second coil winding bodies 26, 27 surround the first leg 9 and the second leg 10 with the first and the second inner side plates 31a, 32a, outer side plates 31b, 32b and the first and the second back plates 29, 30, and on those first and second inner side plates 31a, 32a, first and second outer side plates 31b, 32b and first and second back plates 29, 30 a first coil 11 and a second coil 12 (hereinafter referred to as "first coil and second coil") are wound. Hereinafter, the portions where coils 11 and 12 are wound are referred to as "coil winding portion 33".

The connection plates 28, 28 are arranged in parallel in such a manner as interposing said coil winding portions 33, have a rectangular shape in a horizontal plane and projecting like flanges from the edges of the first back plate 29 and the second back plate 30.

On the distal ends of the first side plate 31a, 31b and the second side plates 32a, 32b, inclination surfaces 35 inclined outwardly spreading from opening 34 (see FIGS. 1 and 2). Thereby, any damage on the first and second coils 11 and 12 to be wound is expected to be prevented.

Comparing the height of the first and second inner side plates 31a and 32a with the outer side plates 31b and 32b, it is settled lower than the one of the latter side plates 31b and 32b, but the thickness thereof is equivalent to or larger than the thickness of the magnetic core 3. Further, the thickness of the first and the second inner side plates is smaller than the thickness of the first and second outer side plates 31b, 32b. Merely on the first and second outer side plates 31b and 32b of the first and second inner and outer side plates 31a, 31b, 32a, 32b, there are provided hooks 37 projecting in the opening 34 and being hooked on the rear side 36 of the legs 9 and 10 of the magnetic head core as shown in FIG. 6.

In order to set said coil bobbin 24 on the magnetic head core, by abutting the inclination surfaces 35 of the first inner and outer side plates 31a and 31b against the front edge 9a of the first leg 9 and of the second inner and outer side plates 32a, 32b of the front edge 10a of the second leg 10 respectively, then pushing the coil bobbin 24 on the magnetic head core, distal ends of the side plates are resiliently opened.

Thus, each hook 37 goes forward to the rear sides 36 while sliding along legs 9, 10 respectively. When tip end of each hook reaches the rear side 36, the side plates 31b and 32b return to the initial position resiliently, thereby the hooks are hooked on the rear side 36 to complete the installing of the coil bobbin 24 on the magnetic head core 3 in such a manner that the side plates 31a, 32a, 31b, 32b and the rear plates 29 and 30 surround the core 3.

Since the hooks 37 are hooked on the rear sides 36, the coil bobbin 24 are prevented from removing from the magnetic head core 3.

Coils 11 and 12, the terminals of which is connected, are wound around the coil winding portions 33 provided between the connection plates 28, 28 in a balanced manner so as to cancel any outer magnetic field.

Since the inner side plates 31a, 32a have no hook such as hooks of the outer side plates 31b, 32b, the inner side plates do not generate a force of departing the first core 6 and the second core 7, there is no risk of damaging.

Further, since the thickness of the inner side plates 31a and 32a is smaller than the outer side plates 31b and 32b, a space between the coil winding bodies 26 and 27 is secured, which contributes for an increased workability for coil winding process in a balance manner after the install of the coil bobbin 24 on the magnetic head core 3.

The length of the inner side plates 31a and 32a is small compared with the outer side plates 31b and 32b, which also contributes to the increase of the workability for coil winding, but, since such length is a little larger than the length of the inner side plates, any damage at the edge portions 9b and 10b of the rear side 36 of the magnetic head core 3 such as coil cutting and insulation malfunction is prevented.

Due to a pair of connection plates 28, 28 formed in a unit with the first and second winding bodies 26, 27 of the coil bobbin 24, the size of the bobbin is large enough for easy handling for excellent workability.

In this embodiment, the inclination surfaces 35 of the inner and outer side plates 31a, 31b, 32a and 32b are inclined toward the opening 34, but the inclination direction of the inner side plates 31a and 32a can be identical with the inclination of the outer side plates 31b and 32b.

The coil bobbin 24 of the present invention is formed symmetrical left and right with respect to a center line A crossing perpendicular to the longitudinal direction of a pair of connection plates at an intermediate point thereof and symmetrical upward and downward with respect to a center line B laid between a pair of connection plates 28, 28.

Figure 9:
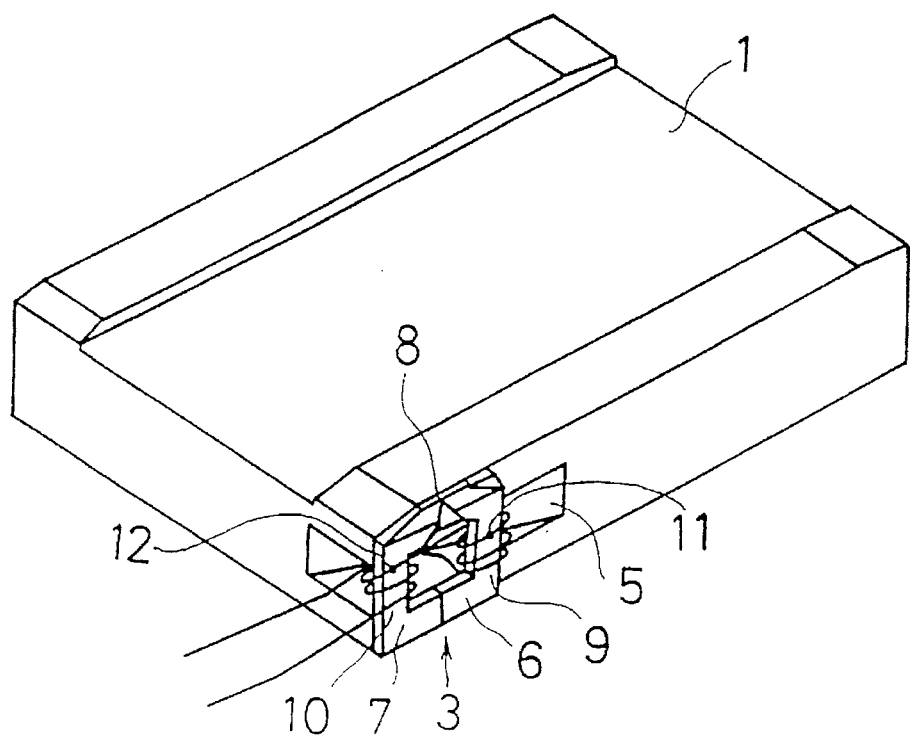
FIG. 9 shows a perspective view of one example of the type of a floating magnetic head, the core of which is to be bonded on one side of a slider
Figure 10:
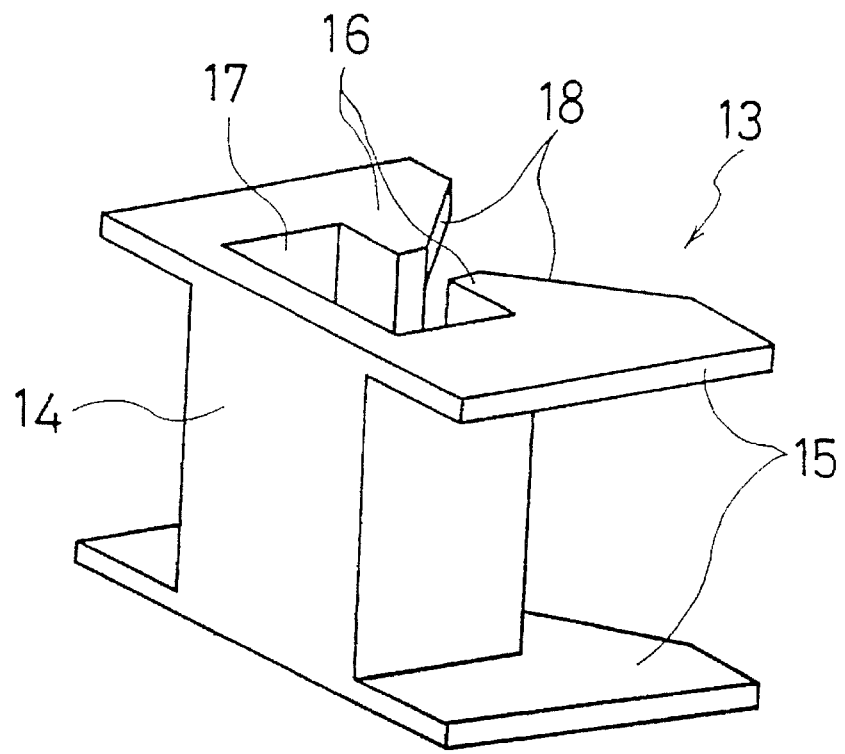
FIG. 10 shows a perspective view of one example of coil bobbin for use of a conventional magnetic head
Figure 11:
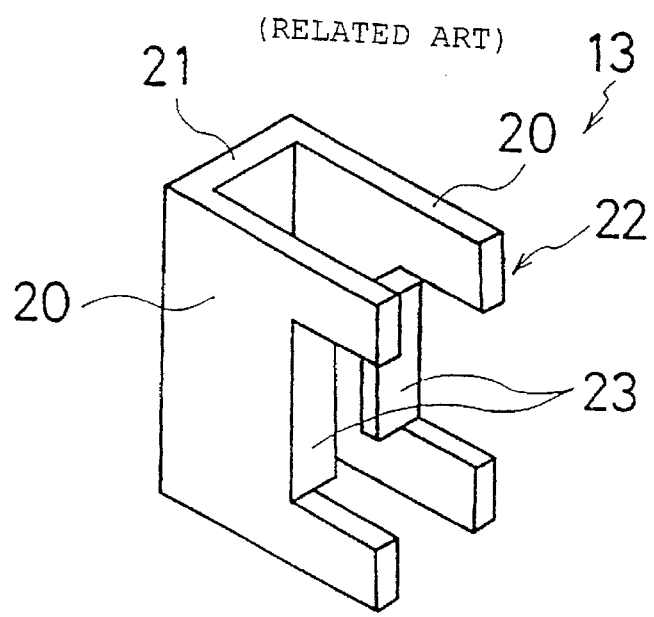
FIG. 11 shows an another example of coil bobbin for use of a magnetic head core

Thereby, since it is free in the position of the bobbin such as upside-down or reverse in left and right side when mounting it on the core, it can be used for either regardless of up/down type (in FIG. 9, a down type is illustrated, and a mirrored image is an up type, and those are used in a pair, by setting on both upper surface and bottom surface of a disk.) which enables the bobbin 24 to be used for a variety of needs.

Figure 7:
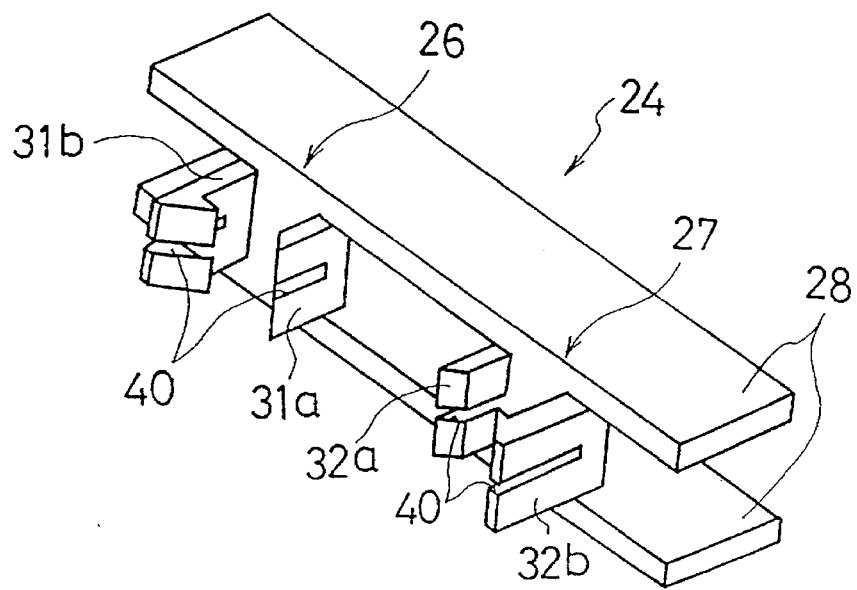
FIG. 7 shows a perspective view of the second embodiment of a coil bobbin according to the present invention
Figure 8:
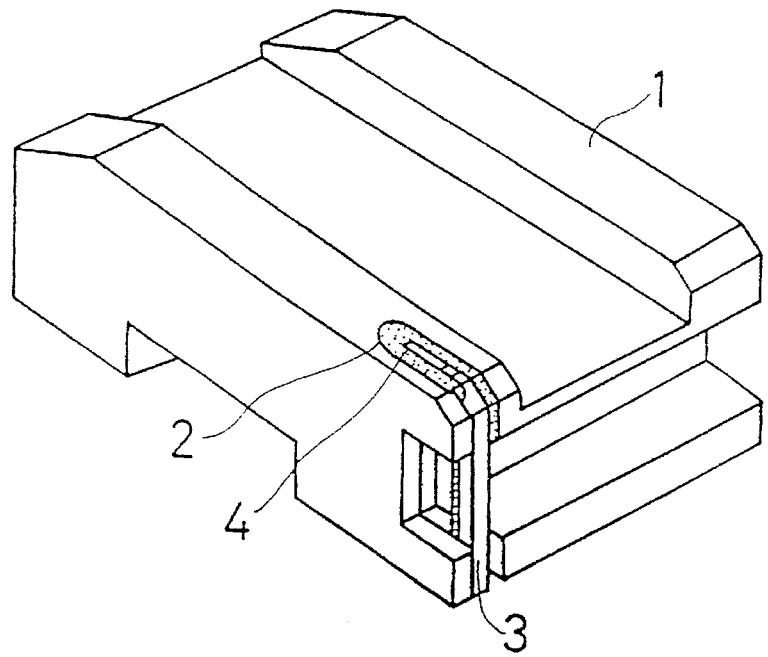
FIG. 8 shows a perspective view of one example of the composite type of magnetic head

Next, based on FIG. 7, the second embodiment of the coil bobbin 24 according to the present invention is explained. To the same elements as in the first embodiment, the identical reference numerals are referred and the explanations thereto are omitted.

In this type of coil bobbin 24, slits 40 are formed at each central portion of the first and second inner and second side plates 31a, 31b, 32a, 32b, the size of the width of the slit is smaller than the diameter size of the coils 11 and 12 (for instance approximately 25 μm).

In this coil bobbin 24, when installing it on the magnetic head core 3, due to the slit 40 the coil bobbin 24 becomes easy to be deformed resiliently to improve a workability of installation process.

Since the coil bobbin for use of a magnetic head core is thus constituted as explained above, wherein a pair of coil winding bodies are connected in a unit by a pair of connection plates, the size of the coil bobbin does not become smaller extremely and the workability is improved in handling for easy mounting on the core. Due to the provision of a pair of coil winding bodies, it becomes possible to mount the coil bobbin on the magnetic head core having two leg portions, thereby it becomes possible to wind coil in a balance manner.

Further, since the hooks are provided merely on the outer side plates of the inner and outer side plates, the stress loaded on the core when mounting thereon can be minimized to prevent it from being damaged.

Due to the inclination surfaces projecting in the opening direction provided on the distal ends of a pair of outer side plates, when mounting it on the magnetic head core, by pressing it onto the leg portions of the magnetic head core the outer plates are gradually opened due to the protected portion of the inclination surfaces, the rear side of which is a hook, and at last the hooks are snapped in the rear sides of the leg portions resiliently, which enables the bobbin to be mounted automatically.

Still further, since the thickness of the inner side plates is smaller than the thickness of the outer side plates, an extra spacing can be prepared between a pair of coil winding bodies, which enables the coil winding process in a balance manner easier on the coil bobbin after installation on the magnetic head core.

Since the length size of the inner side plates are shorter than the length size of the outer side plates but equivalent to or a little bit larger than the thickness size of the magnetic head core, as well as in the above case, the space for coil winding process is secured and the mounting workability is increased, which prevents the coils wound around the coil winding bodies from cutting at the edge corners of the rear side of the legs or from falling in malfunction of electric insulation.

Further, the coil bobbin is formed symmetrical leftward and rightward with respect to a vertical plane crossing perpendicularly to a longitudinal direction of the connection plate and also symmetrical upward and downward with respect to a horizontal plane crossing a center line between a pair of connection plates, it may be mounted on the core at random without directional limitation, which may bring about a wide range of applicability to the coil bobbin.

What is claimed is:

1. A coil bobbin of molded resin integrally for use with a magnetic head core comprising:

a pair of connection plates arranged in parallel;

a pair of coil winding bodies formed in U-letter shape with each coil winding body of said pair having a back plate, and inner side plate and an outer side plate, which are to be mounted on a pair of parallel leg portions of a magnetic head core respectively, and arranged between said connection plates with the opening side of the U in one direction;

inclination surfaces provided on the tip of each side plate and obliqued toward the opening of the coil winding body respectively;

hooks formed by being elongated continuously from said inclination surfaces and projected in the opening, which are provided merely on the outer side plates and hooked on each rear side of the legs of the magnetic head core.

2. The coil bobbin according to claim 1, wherein the height size and thickness size of the inner side plate are smaller than the height size and the thickness size of the outer side plate.

3. The coil bobbin according to the claim 1, wherein the coil bobbin is formed symmetrically leftward and rightward with respect to a vertical plane crossing perpendicularly to a longitudinal direction of said connection plates and also symmetrically upward and downward with respect to a horizontal plane crossing a center line between said pair of connection plates.

4. A coil bobbin according to claim 1, wherein all of the inner and outer side plates comprise slits having a width size smaller than the diameter size of the coil to be wound on said bobbin.

* * * * *